INVENTOR.
C. BUFF
BY C. H. Suydam
AGENT

| TRANS. FREQ. | | CHANNELS A | CHANNELS B | REC. DETECTED FREQ. | | CHANNELS A | CHANNELS B |
|---|---|---|---|---|---|---|---|
| $F_1$ | $F_c + 300$ | M | M | $f_1$ | 975 | M | M |
| $F_2$ | $F_c + 100$ | M | S | $f_2$ | 1175 | M | S |
| $F_3$ | $F_c - 100$ | S | M | $f_3$ | 1375 | S | M |
| $F_4$ | $F_c - 300$ | S | S | $f_4$ | 1575 | S | S |

INVENTOR.
C. BUFF
BY C. H. Suydam
AGENT

United States Patent Office 3,048,658

Patented Aug. 7, 1962

3,048,658

TWINPLEX TELEGRAPH TRANSMISSION

Christopher Buff, Massapequa, N.Y., assignor to Mackay Radio & Telegraph Company Filed Jan. 28, 1960, Ser. No. 5,257
12 Claims. (Cl. 178—88)

This invention relates to telegraph systems and more especially it relates to systems employing individual spaced frequencies for the intelligence transmission.

A principal object of the invention is to provide an improved telegraph system utilizing distinctive frequencies for respective signal elements and wherein the frequency spectrum is more efficiently utilized to transmit simultaneously a plurality of separate message elements such for example as telegraph mark and space elements.

Another object is to provide a novel method and apparatus for transmitting a plurality of separate telegraph message elements employing so-called Twinplex frequency shift transmission, and wherein the frequency band for transmission representing the several signal elements is much narrower than that heretofore required in such systems.

A feature of the invention relates to a carrier shift telegraph transmission system wherein the carrier shift range for a plurality of separate telegraph messages is approximately half that heretofore required, and without sacrificing reliability and faithfulness in the telegraph reproduction system.

Another feature relates to a method and apparatus for Twinplex telegraph signaling wherein the mark and space conditions from two separate telegraph signaling channels are transmitted by representative spaced frequencies with a relatively small frequency spacing between the respective frequencies, and at the receiver the narrow frequency spectrum is received and then increased in frequency width at a fixed ratio, to correlate the signals with the speed requirements of well known printing telegraph machines and the like.

The invention is in the nature of an improvement on the system disclosed in U.S. Patent No. 2,650,266, granted August 25, 1953, which has come to be known as the Twinplex system of telegraph communication, and the invention finds its primary utility in connection with such system.

Accordingly the invention will be described in connection with a typical Twinplex system such for example as disclosed in said U.S. Patent No. 2,650,266 and also in the article by Christopher Buff in the periodical "Electrical Communication" for March 1952, pages 20 to 33.

Figure 1:
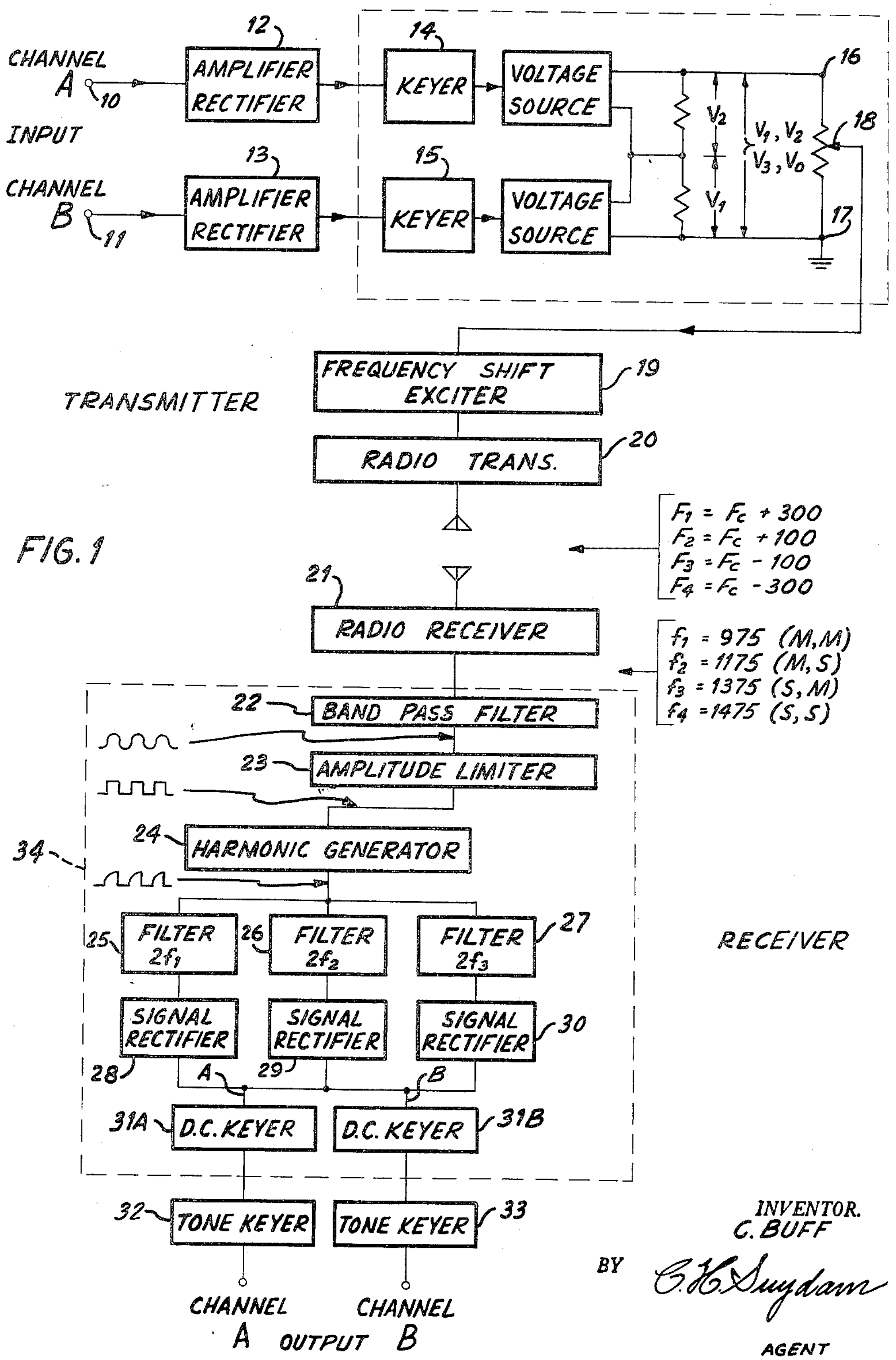
FIG. 1 is a schematic block diagram of a Twinplex system embodying the invention.

Inasmuch as the various components of a Twinplex or similar telegraph system are well known in the art, they are shown in FIG. 1 in block diagram form. Reference may be had to the said periodical "Electrical Communication" for a more detailed description thereof.

Figures 2, 3:
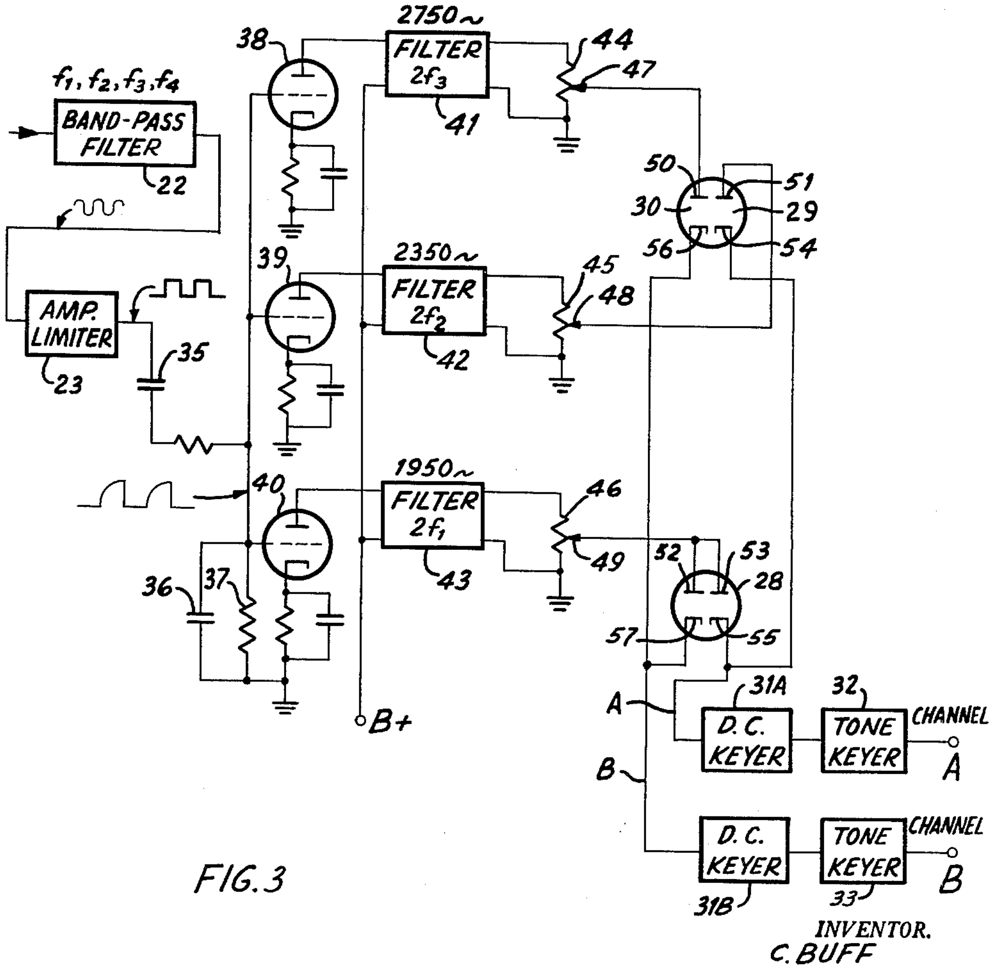
FIG. 2 is a chart explanatory of the mark and space conditions in two signal channels with respect to their representative transmitted and received frequencies.
FIG. 3 is a detailed schematic wiring diagram of a typical harmonic generator or frequency multiplier that is used in the system of FIG. 1.

As described in said periodical, the Twinplex system is based on the proposition that two 2-element mark-space channels can be combined to form on the frequency scale a single 4-element channel wherein each of four frequencies represents one of the four possible mark-space combinations as illustrated in FIG. 2 of the drawing. Heretofore the four frequencies have normally been spaced 400 cycles per second apart for a total frequency shift spread of 1200 cycles. This frequency spacing to a great extent was dictated by the requirements of the telegraph signal reproducing equipment at the receiver, including for example the telegraph printers and the associated filter equipment. Heretofore it has been necessary for low distortion at a maximum speed of 180 bauds that the channel detection filters at the receiver must have at least 250 cycles band width. I have found that the same degree of low distortion and faithfulness of signal reproduction can be obtained by using a much narrower spacing between the four frequencies which are transmitted to represent the four possible mark-space combinations. Thus, in one particular arrangement that has been heretofore used for Twinplex transmission, each of the four possible mark-space combinations has been represented by four frequencies of 1950, 2350, 2750 and 3150 c.p.s. This has necessitated heretofore a total frequency shift of 1200 cycles. These representative frequencies have been transmitted heretofore usually by a frequency shift method of radio carrier. For example, frequency F1 would be represented by $F_c+600$; frequency F2 by $F_c+200$; frequency F3 by $F_c-200$; and frequency F4 by $F_c-600$. In other words, the total frequency shift of 1200 cycles is centered about the assigned carrier frequency. As explained in the said periodical, the limitation at the receiving end is that necessary to circumvent the "pips" and "splits" that are inherent in the Twinplex method of transmission. With the above noted interfrequency spacing this has required for faithful and low distortion reproduction channel detection filters which must have at least 250 cycles band width. In accordance with the present invention the existing receiving detection filters are still utilized in order to meet the above noted detection filter requirements, but the transmission from the transmitter is effected with a much narrower frequency range. Thus, as shown in FIG. 2 of the drawing, according to the invention the total frequency range of the four frequencies representing the four possible mark-space combinations has only 600 cycles, thus effecting at least a 50 percent reduction in the carrier transmission range required. In other words, the four frequencies F1, F2, F3 and F4 are represented respectively by 975, 1175, 1375 and 1575 cycles. I have found that even with this 50 percent reduction in the total range and with this 50 percent reduction in the interfrequency spacing, it is still possible to use the standard Twinplex receiving equipment with slight modification and while preserving the freedom from distortion in the signal reproduction. The invention, therefore, allows for a two-to-one reduction in transmitted frequency shift without reducing the necessary detection-filter band width at the receiver. If the detection-filter band widths as the receiver were simply cut in half so as to correspond with the 50 percent reduction in the total range of the carrier shift, then the telegraph distortion at 180 bauds would be extremely high, and might render the system practically unusable.

Referring to FIG. 1 of the drawing, the various components represented therein by the several blocks are the same as those described in the said periodical. The upper portion of FIG. 1 represents the transmitting end of the system and the lower portion of FIG. 1 represents the receiving end of the system. The transmitting end may be the same as that described in the said periodical or as described in the said Patent No. 2,650,266. The two signal channels which may represent separate message channels designated A and B are arranged to produce mark and space conditions representing the respective messages at respective input terminals 10 and 11. These signals are amplified and rectified in respective devices 12, 13 to control respective keyer devices 14 and 15 which develop across the points 16 and 17 for respective direct current voltages represented by the symbols $V_0$, $V_1$, $V_2$, $V_3$. Thus for example a mark signal at terminal 10 and a simultaneous mark signal at terminal 11 will develop across the points 16 and 17 a zero voltage; for a mark condition at terminal 10 and a space condition at terminal 11 there will be developed across the terminals 16, 17 an output of one volt; for a space condition at terminal 10 and a mark condition at terminal 11 a voltage across terminals 16 and 17 will be two volts. Likewise for a space condition at terminal 10 and a space condition at terminal 11 the voltage across terminals 16 and 17 will be three volts. It will be understood, of course, that these voltage conditions are merely given as typical and any other equally gradated range of voltages may be produced at the terminals 16 and 17 in accordance with the respective four mark-space combinations that may exist at terminals 10 and 11. The voltage developed across terminals 16 and 17 may be adjustably applied through a potentiometer contact to any well known frequency shift exciter 19. The contact 18 may be adjusted to control the overall range of the frequency shift of the exciter 19. The exciter 19 is connected to any well known radio transmitter 20 which may generate a center carrier frequency of $F_c$ which is arranged to be shifted on each side of the center frequency to represent the four possible voltage conditions at contact 18. Heretofore it has been found necessary in order to preserve the required low distortion in the signal reproduction at the receiver to employ an inter-frequency spacing of 400 cycles, thus requiring an overall frequency shift range of 1200 cycles. I have found that the desired low distortion in the signal reproduction can still be obtained by cutting the inter-frequency spacing in half and likewise cutting the total frequency shift range of the transmitter 20 in half. For example, the frequencies transmitted by the transmitter 10 may be $F_c+300$, $F_c+100$, $F_c-100$ and $F_c-300$.

This frequency shifted carrier is then received in any well known frequency shift radio receiver 21 which produces at its output four distinctive frequencies representing the original four transmitted mark-space combinations. In accordance with the invention, the radio receiver produces at its output the four frequencies having an inter-frequency spacing of 200 cycles per second and a total range of 600 cycles per second. These frequencies are then passed through a suitable band pass filter 22 and are subjected to amplification and limiting in any well known amplifier limiter 23. The detected signals at the output of the filter 22 are substantially sinusoidal but when acted upon by the amplitude limiter 23 they are correspondingly square shaped waves an indicated in FIG. 1.

In accordance with the invention and in order to utilize the existing telegraph signal reproduction means, it is necessary in order to avoid excessive distortion to convert the narrow band and narrowly spaced frequencies from the limiter 23 into a wider band with wider inter-frequency spacing. In accordance with the invention, therefore, the frequencies from the limiter 23 are subjected to any well known frequency multiplication process represented for example by the harmonic generator 24 which produces at its output, signal waves which are rich in the second harmonic. The harmonic generator 24 has its output connected to three respective filters 25, 26, 27. Filter 25 passes the second harmonic of frequency $f_1$; filter 26 passes the second harmonic of frequency $f_2$; and filter 27 passes the harmonic of frequency $f_3$. The filters 25, 26 and 27 are connected to the signal rectifiers 28, 29, 30 which are connected to any well known direct current keyer 31A, 31B to key the channels A and B in accordance with the respective mark and space combinations. Thus the rectified output of the filter 25 keys channels A and B both to mark; the rectified output of the filter 26 keys channel A to mark and channel B to space; and the rectified output of filter 27 keys channel A to space and channel B to mark. As described in said periodical and in said Patent No. 2,650,266, direct current keyers 31A, 31B are controlled by the respective voltage conditions at the outputs of the rectifiers 28, 29 and 30 so as to control the direct current keyers 31A, 31B and the respective channel tone keyers 32, 33. It should be observed that the fourth frequency $f_4$, which represents space condition on channel A and simultaneous space condition on channel B is not passed through any filter and may be used to hold the limiter output, and since it does not pass to a signal rectifier under the $f_4$ frequency condition, both channels A and B go to the space condition. Thus, the necessary four possible combinations of mark and space are reproduced in the receiving channels A and B with the reduced carrier frequency shift and reduced inter-frequency spacing but without sacrificing the required frequency bands which are necessary in order to properly reproduce the signals on the teleprinter or other equivalent mechanism (not shown) connected to the output channels A and B.

While the invention is not limited to any particular manner of doubling the frequency of the detected signals from the radio receiver 21, preferably the harmonic generator, rich in second harmonics, is employed. One typical arrangement that may be used is shown in FIG. 3. The parts of FIG. 3 which function the same as the corresponding parts of FIG. 1, bear the same designation numerals. Thus, the portion of the system of FIG. 1 interconnected within the dotted rectangle 34 may be of the type shown in FIG. 3. The narrow band detected frequency shift signals $f_1$, $f_2$, $f_3$, $f_4$ are passed through the band pass filter 22 and appear as substantially sinusoidal waves which are then passed through the amplifier limiter 23 to produce at the output thereof corresponding uniform amplitude square waves.

These square wave frequencies are applied through coupling condenser 35 and through an integrating network of any well known kind, comprising for example condenser 36 and resistor 37, to the control grids of three amplifier tubes 38, 39, 40. As a result, the square wave signals are distorted to substantially triangular shape signals which are rich in second harmonics. These second harmonics fall exactly in the center of the passbands of the respective filters 41, 42, 43, which are the filters normally used in the conventional wide band Twinplex system, as described in said periodical. Thus, the filter 41 passes the frequency $2f_3$ (2750 c.p.s.); filter 42 passes frequency $2f_2$ (2350 c.p.s.); and filter 43 passes frequency $2f_1$ (1950 c.p.s.).

Each filter has its output connected to a separate potentiometer resistor 44, 45, 46. The contact arm 47 is connected to the plate or anode 50 of a signal rectifier 30; the arm 48 is connected to the anode 51 of the signal rectifier 29. Merely for convenience, the rectifiers 29 and 30 may form a dual rectifier of any well known construction. Likewise the arm 49 is connected in parallel to the anodes 52 and 53 of another dual rectifier 28. The cathodes 54 and 55 are connected together and to the input conductor A of the direct current keyer 31A. Likewise the cathodes 56 and 57 are connected together and to the input conductor B of the direct current keyer 31B. These keyers in turn control respective tone keyers 32, 33 which control the telegraph signal reproducing equipment, for example a telegraph printer associated with each of the receiving channels A and B.

From the foregoing it will be seen that the 975 c.p.s. signal, which appears at the grids of tubes 38—40, has its second harmonic pass only by the filter 43 and is applied to both the anodes 52, 53 of rectifier 28, thus keying both the A and B channels to mark. When the 1175 c.p.s. signal appears, its second harmonic is passed only by filter 42 and is applied only to anode 51, thus keying channel A to mark, but leaving channel B on space. When frequency 1375 c.p.s. appears its second harmonic is passed only by filter 41 and is applied only to anode 50, thus keying channel B to mark but leaving channel A on space. The fourth frequency 1575 c.p.s. does not appear at any of the rectifier anodes and, therefore, both channels A and B are left on space.

It has been found that since the filters 41—43 pass the separate detected frequencies $f_1$, $f_2$, $f_3$ with their necessary keying side bands, the telegraph signals can be reproduced in the receiving channels A and B with no more distortion than if the signals were transmitted over the radio transsion channel with twice the frequency swing of the carrier. However, the overall passband of the input filter 22, being only one-half that used for the prior known wide band carrier transmission, allows the invention to operate with approximately 3 db improvement in signal-to-noise ratio.

It will be understood, of course, that while specific frequency values and carrier shifts are mentioned hereinabove, that they are merely given as representative and that the invention can be used with any other frequencies providing the overall swing of the carrier is restricted or narrowed as above mentioned and the detected frequencies at the receiver, representing the four possible mark and space combinations, are multiplied or double in frequency so as to accommodate them to the required band width for operating the telegraph printers or receivers with the required minimum distortion. Furthermore, while the four voltage conditions $V_0$—$V_3$, developed at the transmitter to represent the four possible mark and space combinations, have been described as being transmitted over a radio transmission channel of the frequency shift kind, it will be understood that they may be transmitted as respective amplitude modulations of a carrier whether of voltage or current so long as they are received and reproduced as the corresponding detected frequencies $f_1$—$f_4$ above mentioned.

Other changes and modifications may be made in the disclosed embodiment without departing from the spirit and scope of the invention.

What is claimed is:

1. A telegraph system of the kind wherein simultaneous mark and space combinations from two separate signal sources are represented by respective spaced frequencies, comprising means to receive and detect said frequencies, means to derive other frequencies from said detected frequencies, said other frequencies having an integrally higher ratio with respect to the detected frequencies, a plurality of telegraph signal receiving channels to be controlled by said derived frequencies, and keying means for said receiving channels controlled by said derived frequencies to key said channels simultaneously in response to a respective one of said derived frequencies.

2. A telegraph system of the kind wherein each simultaneous mark and space combination from two separate signal sources is represented by one of a series of frequencies, a single radio transmission channel over which said frequencies are transmitted with a predetermined limited carrier swing, means to receive and detect said frequencies, means to convert each of said detected frequencies to a respective higher order harmonic, a plurality of telegraph signal receiving channels to be controlled by said converted frequencies, and keying means for both said receiving channels whereby both of said channels can be simultaneously keyed to produce desired mark and space conditions therein in accordance with a particular one of said converted frequencies.

3. A telegraph system of the kind wherein each simultaneous mark and space combination from two separate channels is transmitted as a respective modulation of a radio carrier, means to receive and detect from the carrier frequencies each representative of one of said simultaneous mark and space combinations, means to multiply said detected frequencies, a plurality of telegraph signal receiving channels, keying means for each of said channels, and means to key both said channels simultaneously to reproduce a particular combination of mark and space in said channels as determined by a particular one of said multiplied frequencies.

4. A telegraph system comprising means to modulate a radio carrier by a set of four signals each of which represents one of four possible mark and space combinations simultaneously produced by a pair of telegraph signal sources to produce a corresponding set of four carrier frequencies, the carrier frequencies having an inter-frequency spacing "n", means to receive and detect from said carrier corresponding keying control frequencies also with an inter-frequency spacing "n", a pair of telegraph signal reproducing channels, keyer means for each of said channels, means to derive from said detected frequencies other respectively doubled frequencies with an inter-frequency spacing "2n", and means for simultaneously keying said reproducing channels by their respective keyers to produce any one of four combinations of mark and space as determined by particular ones of said derived frequencies.

5. A telegraph system comprising means to develop four carrier frequency signals each representative of one of four possible combinations of mark and space elements produced by a pair of separate telegraph signal sources, means to receive and detect from said carriers a set of four frequencies each representative of a corresponding one of said four combinations, means to multiply the frequency of each detected frequencies by a predetermined integer, a pair of telegraph signal reproducing channels, a keyer for each channel, and means controlled by each of said multiplied frequencies to key both said channels simultaneously to a corresponding one of said combinations.

6. A telegraph system according to claim 5 in which the said multiplying means includes a network for converting said detected frequencies into related frequencies rich in the second harmonics of said detected frequencies.

7. A telegraph system of the Twinplex kind having means to receive and detect a set of four substantially sinusoidal signal frequencies $f_1$, $f_2$, $f_3$, $f_4$ each representative of one of four possible combinations of simultaneous mark and space conditions from two separate signal sources, means to convert said sinusoidal frequencies into similar signals of frequency $2f_1$, $2f_2$, $2f_3$, $2f_4$ respectively, a filter for all but one of the said converted frequencies, a set of signal rectifiers connected to the outputs of said filters, a pair of telegraph signal reproducer channels, a pair of keyer devices one for each of said channels, and means connecting said keyer devices, to said rectifiers whereby in response to any given one of said converted frequency signals both said reproducer channels are keyed to represent a corresponding one of said four combinations.

8. A telegraph system according to claim 7 in which said detected frequencies are first converted into signal waves of substantially rectangular wave shape, and means to convert said rectangular waves into substantially triangular waves rich in the second harmonics of said detected frequency signals.

9. A telegraph transmission system comprising a telegraph transmitter having means to set up signal voltages in two separate mark and space telegraph channels, with the transitions between mark and space conditions substantially synchronized, means to combine said voltages each of a respective different amplitude to set up four different control voltages each representing respectively one of four possible combinations of mark and space conditions in said two channels, means to generate a carrier frequency, means to apply said control voltages to shift the carrier frequency to any one of four distinct frequencies each representing one of said four combinations, carrier detection means to detect four signal frequencies each corresponding respectively to one of said four control voltages, means to double the frequency of said detected frequencies, a filter for all but one of the doubled frequencies, a plurality of telegraph signal reproducer channels, keyer means for each of said channels and means connecting said keyer means to said filters whereby both said keyers can be simultaneously keyed to represent one of said four mark and space combinations in accordance with a particular one of said doubled frequencies.

10. A telegraph receiver comprising in combination a frequency shift radio receiver arranged to respond to four different received carrier shifts to produce four respective audio-frequency signals each of which is representative of any one of four possible combinations of mark and space conditions in two separate telegraph channels, a pair of telegraph signal reproducing channels, a keyer for each of said channels, means to double the frequency of said audio frequencies, respective filter means for all but one of said doubled frequencies, and means connecting said filter means to said keyers to simultaneously key both of said reproducer channels to any one of said possible mark-space combinations depending upon a particular one of said doubled frequencies.

11. A telegraph transmission system employing a pair of telegraph signal reproducers each of which is controlled by a respective one of four audio-frequencies but which audio-frequencies require relatively wide inter-frequency spacing "F," means to transmit four carrier frequencies each representative of one of four possible combinations of mark and space conditions from two separate synchronized sources with the inter-frequency carrier spacing being $(F/n)$ where "$n$" is an integer, means to receive and detect from said carriers respective audio-frequency signals with an inter-frequency spacing $(F/n)$, means to multiply the said detected frequencies by the integer "$n$" to produce corresponding audio-frequencies with an inter-frequency spacing of "F," a pair of keyers for each of said telegraph signal reproducers, and means to key simultaneously each of said channels to any one of said four possible combinations of mark and space depending upon a particular one of said multiplied frequencies.

12. A telegraph system according to claim 11 in which the detected frequencies are converted to second harmonic frequencies and all but one of said second harmonic frequencies is passed through a respective filter, and signal rectifier means connected to said filters to control the said simultaneous keying of said two telegraph signal reproducers.

References Cited in the file of this patent

UNITED STATES PATENTS

| | | |
|---|---|---|
| 2,301,373 | Cox | Nov. 10, 1942 |
| 2,510,072 | Clark | June 6, 1950 |
| 2,701,276 | Pletscher | Feb. 1, 1955 |